July 30, 1935.  F. KORNICHUK  2,009,736
FISHING APPARATUS
Filed June 8, 1934  4 Sheets-Sheet 1

Inventor
Fred Kornichuk
by Roberts Cushman Woodbury
Attys

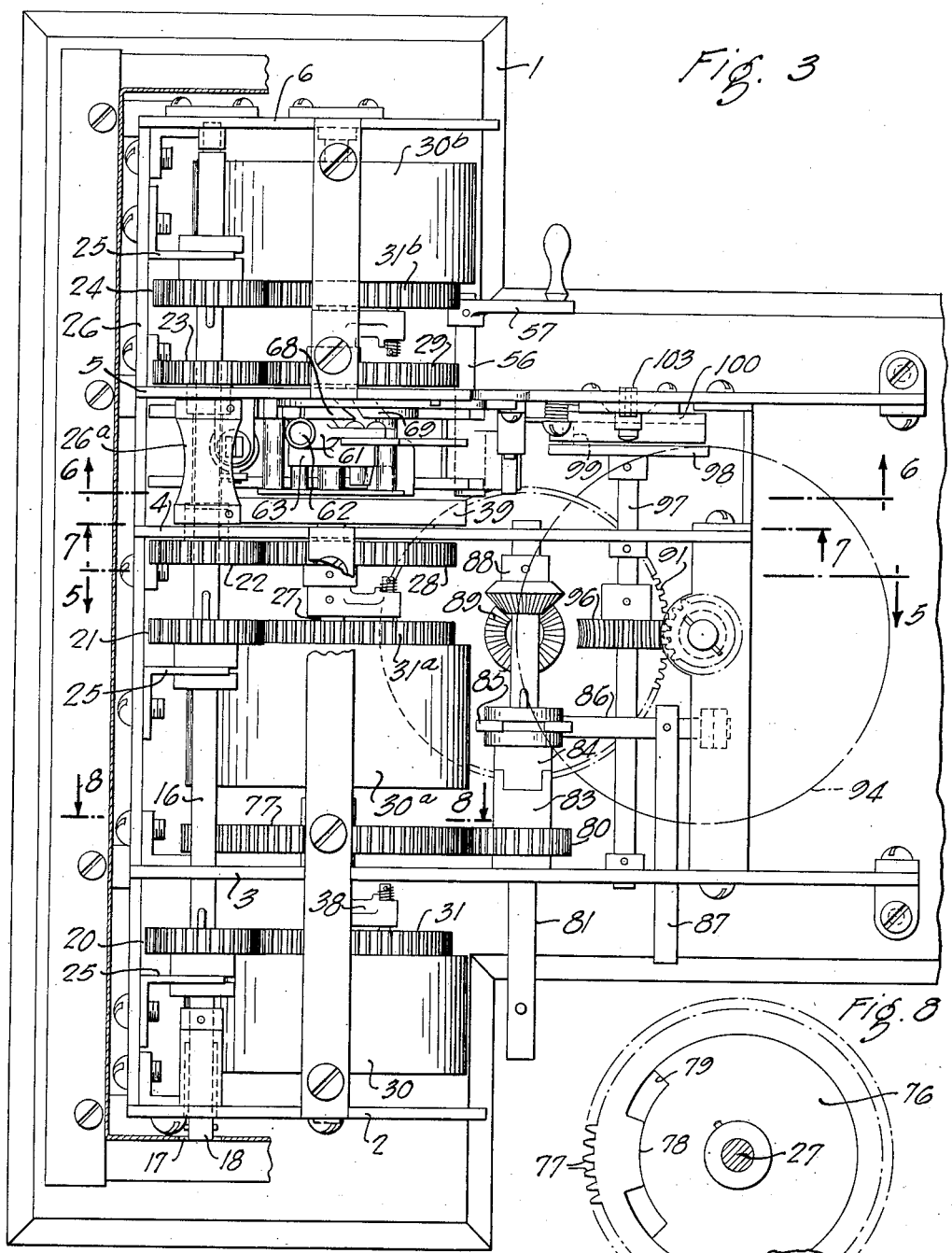

July 30, 1935.  F. KORNICHUK  2,009,736
FISHING APPARATUS
Filed June 8, 1934   4 Sheets-Sheet 3
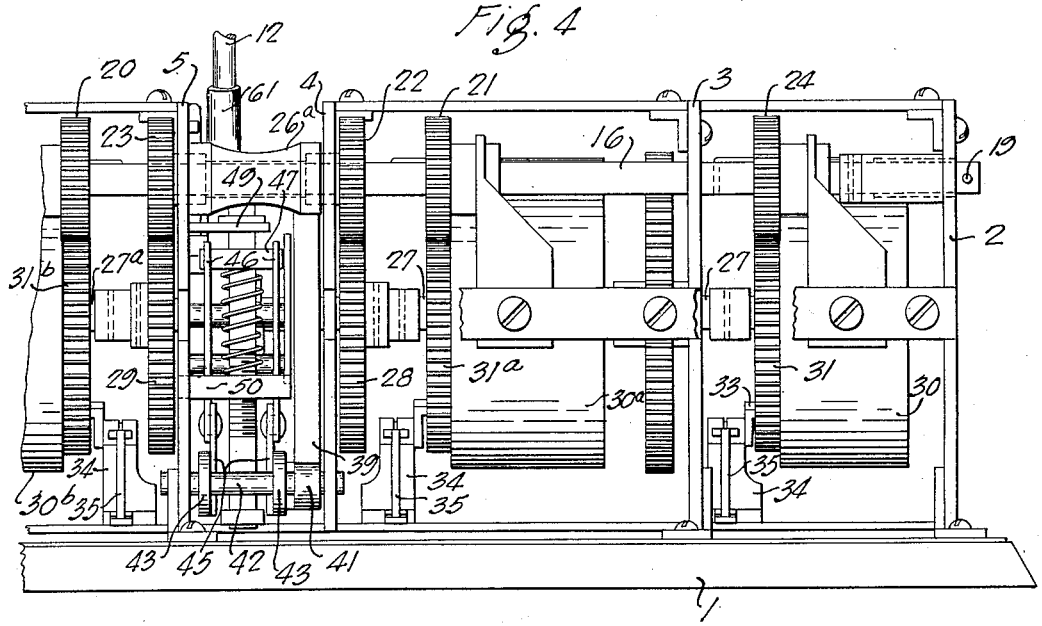
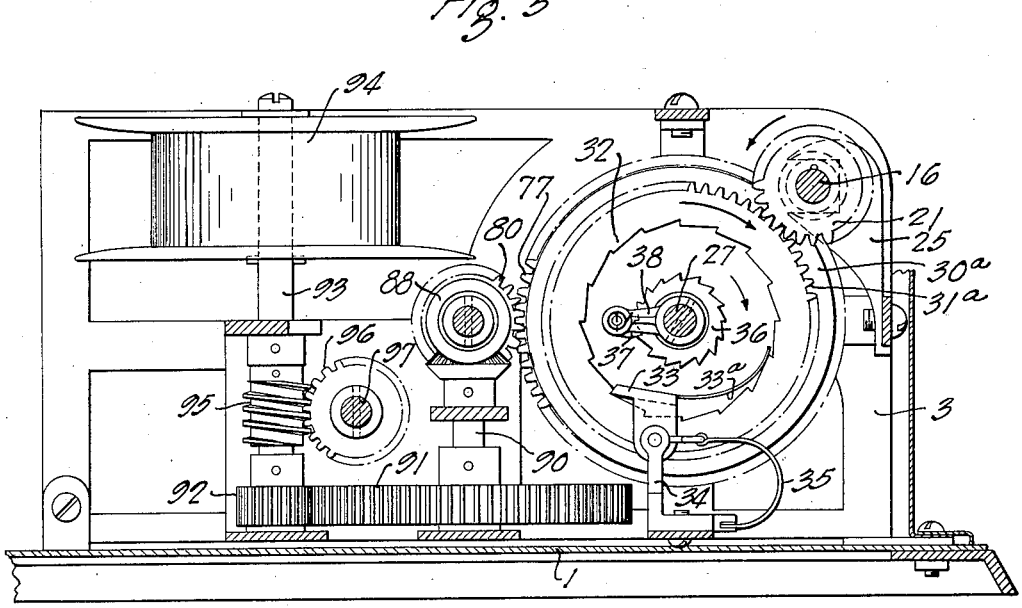
Inventor
Fred Kornichuk July 30, 1935.  F. KORNICHUK  2,009,736
FISHING APPARATUS
Filed June 8, 1934  4 Sheets-Sheet 4

Inventor
Fred Kornichuk
by Roberts Cushman & Woodberry
Attys

Patented July 30, 1935

2,009,736

UNITED STATES PATENT OFFICE 2,009,736

FISHING APPARATUS

Fred Kornichuk, Pelham, N. H.

Application June 8, 1934, Serial No. 729,585

6 Claims. (Cl. 43—4)

This invention pertains to fishing apparatus and relates more particularly to an automatic device of motor actuated type and operating, in response to pull exerted by a fish on a baited hook, to hook the fish and pull it out of the water. The principal object of the invention is to provide a portable apparatus of this type of reliable and effective character and which in its action simulates, so far as may be, the most approved mode of hand fishing. It is considered essential by many anglers, when fishing for fish of most varieties, at least, by means of a hook and line, first securely to hook the fish, when it takes the bait in its mouth, by a sharp quick jerk or pull on the line and thereafter, in order to avoid tearing the hook from the mouth of the fish, to pull in the line at a relatively slower but substantially uniform rate, while keeping the line taut enough to prevent the fish from shaking the hook out of its mouth. In hand fishing with rod and line the first of these operations is usually accomplished by a quick upward swing of the rod, brought about by a movement of the wrist or forearm of the fisherman, while the second stage in the operation is carried out by turning the reel so as to wind in the line,—the flexibility of the pole being relied upon to maintain the desired tension.

In accordance with the present invention I provide mechanism comprising a pole having a guide of usual type for the line, and a reel on which the line may be wound. After properly setting the apparatus, baiting the hook and throwing the latter into the water no further attention is necessary on the part of the fisherman who may, for example, provide himself with a series of my improved devices so that several lines may be in use at the same time. Whenever a fish exerts a substantial pull upon the baited hook the mechanism swings the pole sharply through a short arc thereby imparting to the line the quick jerk necessary to hook the fish. Thereupon the reel is turned at the proper speed to reel the line in and thus land the fish.

Other objects and advantages of the present invention will be apparent from the following more detailed description and from inspection of the accompanying drawings wherein one desirable embodiment of the invention has been disclosed by way of example.

In the drawings

Fig. 3 is a plan view of the apparatus, to larger scale, with the outer casing broken away and partly in horizontal section, the pole being omitted;

Fig. 4 is a fragmentary elevation from the rear of the apparatus, the outer casing or cover being removed;

Fig. 5 is a vertical section substantially on the line 5—5 of Fig. 3, certain parts being omitted;

Fig. 8 is a fragmentary section substantially on the line 8—8 of Fig. 3.

Figure 1:
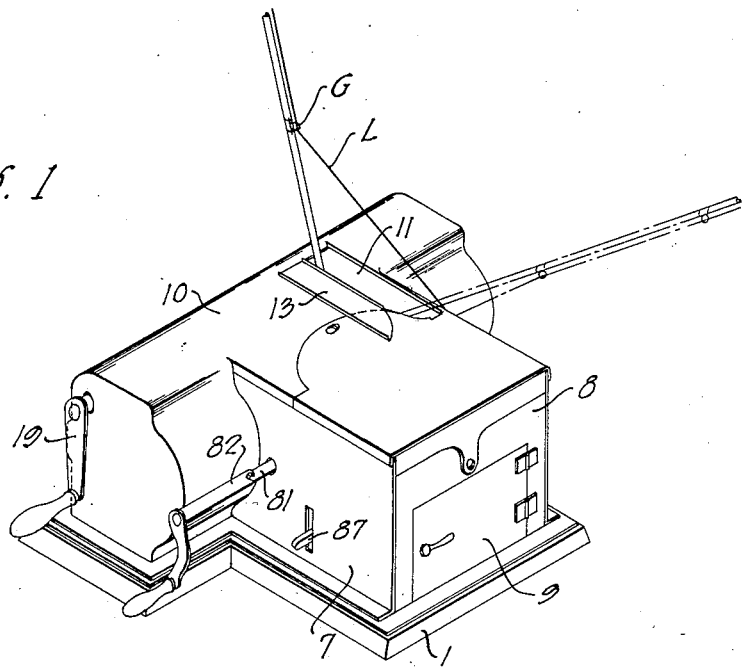
Fig. 1 is a perspective view, to small scale, showing the top, forward, and right-hand sides of the apparatus, and with the pole shown in full lines in its rearward position, and in broken lines in its forward or set position.

Referring to the drawings, the numeral 1 designates a suitable base which carries the frame of my improved apparatus. This base may be of wood, sheet metal or any other appropriate material. The machine frame (Fig. 3) conveniently comprises substantially parallel upright members 2, 3, 4, 5 and 6, which may be secured to the base 1 if desired by means of bolts, screws or the like and which are held in properly spaced relation by appropriate transverse members some of which are hereinafter more specifically referred to.

The frame with the mechanism carried thereby is preferably enclosed within a casing or housing 7 which may be of sheet metal, wood or other suitable material and preferably comprising the front wall 8 having a door or other removable closure 9 giving access to the reel receiving chamber. The top wall 10 of the casing or housing is furnished with an elongate slot 11 for the accommodation of the removable pole 12, the latter being provided with guides G, of usual type, for the reception of the line L. For convenience in carrying the apparatus from place to place the pole 12 is removable, as above noted, and when removed the slot 11 may be closed by means of a hinged cover 13.

Figure 2:
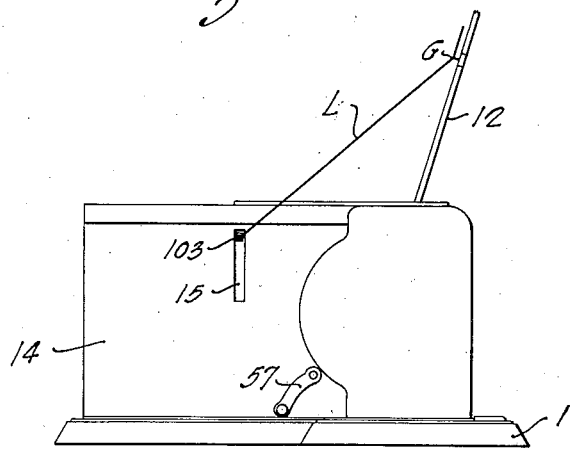
Fig. 2 is an elevation of the left-hand side of the apparatus with the pole in the same position as in Fig. 1.

The left-hand end wall 14 (Fig. 2) is furnished with a vertically elongate slot 15 which registers with the line distributing guide for the reel and which permits the line to pass outwardly from the reel chamber to the guide G on the pole 12.

Referring to Fig. 3 the numeral 16 designates a winding shaft which is arranged to turn in bearings in the upright members 2, 3, 4, etc. of the frame. The right-hand end 18 of this shaft (the left-hand end as viewed in Fig. 3) is disposed opposite to an opening 17 in the end wall of the casing and this end of the shaft 16 is furnished with a removable actuating crank handle 19 (Fig. 1) by means of which the shaft 16 may be rotated. This shaft carries three pinions 20, 21 and 24 respectively, which are splined to the shaft which are prevented from moving endwise on the shaft by means of brackets 25 which engage peripheral grooves in the hubs of the pinions 20, 21 and 24 respectively, said brackets being secured to one of the transverse members 26 which unite the upright frame members 2, 3, etc.

A main drive shaft, comprising the axially aligned parts 27 and 27ª, is mounted in bearing openings in the upright frame members 2, 3, etc. and in parallel relation to the winding shaft 16. Spaced pinions 22 and 23, having their hubs fixed to the opposite ends of a sleeve member 26ª, are arranged to turn freely on the winding shaft 16 and these pinions 22 and 23, which are thus constrained to turn as a unit, mesh with gear wheels 28 and 29 respectively fixed to the drive shaft sections 27 and 27ª. The drive shaft sections are thus constrained to turn as a unit.

The spring motor comprises spring drums 30, 30ª, 30ᵇ, etc. mounted to turn on the drive shaft, the several drums having fixed thereto gear wheels 31, 31ª and 31ᵇ, respectively, such gear wheels meshing with the pinions 20, 21 and 24. Thus by turning crank handle 19 the spring drums may be rotated in unison. Each of these spring drums contains a spring (not shown) of the clock spring type, the outer end of each spring being secured to the periphery of its drum and its inner end being secured to a sleeve turning freely on the main drive shaft.

An internal ratchet wheel 32 (Fig. 5) is secured to each of the spring drums and a pawl 33 cooperates with each of the ratchets 32. These pawls 33 are pivotally supported on brackets 34 secured to a lower transverse member of the frame and each pawl is furnished with a spring tail 33ª which bears against the ratchet teeth and also with a U-shaped spring 35 which tends to hold the pawl in operative engagement with the teeth of the ratchet 32.

The sleeve to which the inner end of the clock spring is secured is furnished with a ratchet 36 (Fig. 5) having its teeth directed oppositely to those of the teeth of ratchet 32, and the teeth of the ratchet 36 are engaged by a spring pressed pawl 37 pivotally mounted on a radial arm 38 fixed to the drive shaft. The arrangement is such, as indicated in Fig. 5, that when the winding shaft 16 is turned in the direction of the arrow, the gear 31ª will be turned in the opposite direction, thus winding up the clock spring while the teeth of the ratchet 32 are successively engaged by the pawl 33 so that the ratchet and spring drum are prevented from turning backward.

Figure 6:
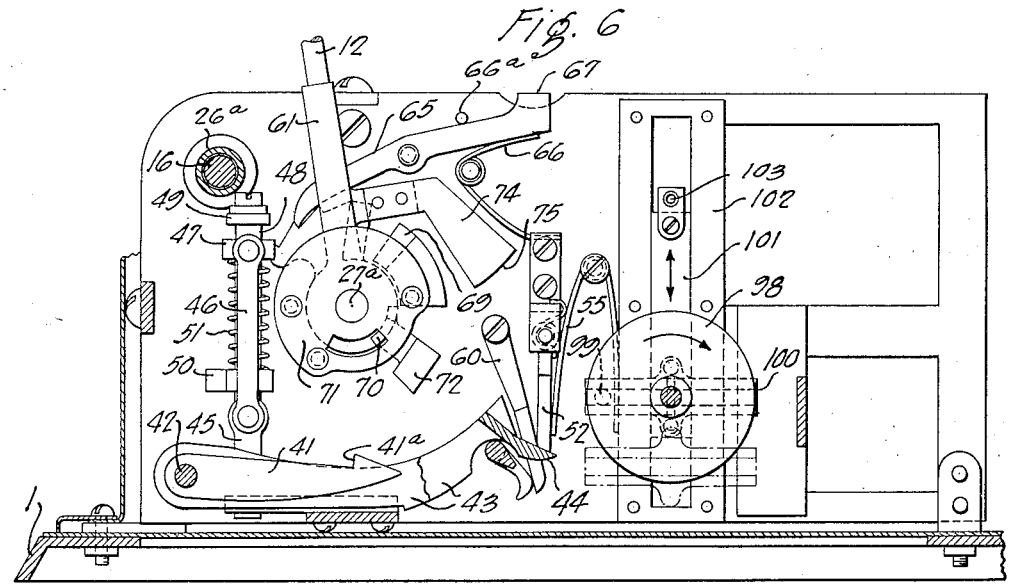
Fig. 6 is a section substantially on the line 6—6 of Fig. 3.
Figure 7:
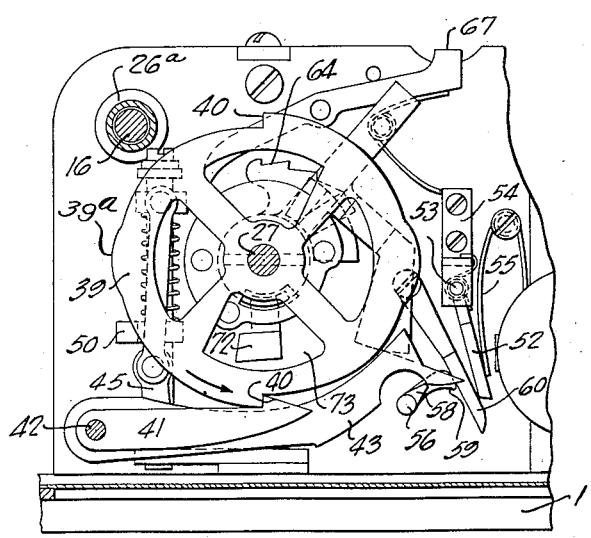
Fig. 7 is a fragmentary section substantially on the line 7—7 of Fig. 3, certain parts being omitted.

To prevent the main drive shaft from turning while the motor spring is being wound and to hold the spring motor in set or energized condition, I provide a ratchet disk or wheel 39 (Fig. 7) which is fixedly secured to the main drive shaft 27. As here illustrated, this ratchet wheel is provided with two diametrically disposed teeth 40 which, during the winding operation, are engaged by a pawl tooth 41ª by the pawl arm 41 (Figs. 6 and 7). This pawl arm 41 is fixedly secured to a short shaft 42 which is mounted to turn in bearing openings in the upright frame members 4 and 5 (Fig. 4). To the shaft 42 is also secured a pair of substantially parallel arms 43 constituting parts of a U-shaped controlling member which also comprises the transverse connecting web 44 (Figs. 6 and 7) adjacent to the free extremities of the arms 43.

At points spaced a short distance forward of the axis of the shaft 42 the arms 43 are provided respectively with upstanding ears or lugs 45 (Fig. 4) to which the lower ends of a pair of parallel links 46 are pivotally secured. The upper ends of these links are pivotally connected to a crosshead 47 arranged to slide on a substantially vertical guide rod 48 supported by a bracket 49 secured to the upright frame member 5. This rod 48 has secured thereto an abutment 50 against which rests the lower end of a coiled compression spring 51 the upper end of which bears against the crosshead 47. The spring 51 thus tends to raise the crosshead and thus lift the ears 45 and swing the free end of the U-shaped control device (comprising the arms 43) in a counterclockwise or upward direction, as viewed in Fig. 6. The spring likewise tends to swing the latch pawl arm 41 in the same direction, that is to say, into a position such as to engage its tooth 41ª with one of the teeth 40 of the ratchet wheel 39. When thus engaged the ratchet 39 and the main drive shaft are held against rotation in a counterclockwise direction, as viewed in Fig. 7.

When it is desired that the main drive shaft shall turn, the latch pawl arm 41 is depressed thus disengaging its tooth 41ª from the ratchet wheel 39. To prevent premature reengagement of the pawl arm with the ratchet a retaining latch plate 52 is provided. This retaining latch plate is pivotally supported at 53 on a bracket 54 attached to one of the upright frame members, and this latch plate is urged in a clockwise direction, as viewed in Figs. 6 and 7, by the action of a hairpin spring 55. When this retaining latch 52 occupies the position shown in Fig. 6, wherein its lower edge engages the upper surface of the web 44 of the U-shaped controlling device, the latter is prevented from rising and thus the pawl arm 41 is held in inoperative position.

To throw the retaining latch plate 52 out of action when the motor is to be wound up or energized, I provide a rock shaft 56 (Figs. 3, 6 and 7), mounted to turn in suitable bearing openings in the frame uprights and having a crank handle 57 (Fig. 3) by means of which it may be rocked. This rock shaft 56 is furnished with a pair of cams 58 and 59. The cam 58 is of substantial length axially of the shaft 56 and is adapted to engage an arcuate lower surface of the web 44, thereby positively to raise the U-shaped controlling member and to lift the latch pawl arm 41 with its tooth 41ª into the path of the ratchet wheel 39. The other cam 59 is disposed at one side of the U-shaped controlling device and cooperates with a pivoted finger 60 which in turn bears against the lower end of the retaining plate 52. When the shaft 56 is turned to the position indicated in Fig. 7 the cam 58, (by engagement with the under side of the web 44) positively holds the latch pawl 41 in its upper operative position, but in moving to this position the longer cam 59 first engages the finger 60 and thereby positively swings the retaining plate 52 away from the web 44 and into the inoperative position shown in Fig. 7, thereby to permit the web 44 to rise in response to the action of the cam 58. When thus positioned, the motor spring or springs may be wound up and the pressure thus generated between the ratchet tooth 40 and the retaining latch pawl tooth 41ᵃ is such that if the shaft 56 now be rocked in a clockwise direction so as to remove the cams 58 and 59 from engagement with the parts 44 and 60 respectively, the U-shaped controller will remain in its uppermost position with the web 44 so elevated that the retaining plate 52 bears against the outer edge of said web.

A pole holder 61 (Figs. 3 and 6) having a socket 62 for the reception of a lower end of the pole 12 is provided with a hub 63 arranged to turn freely (through a limited arc) on the main drive shaft, and also to move axially to a limited extent along said shaft. This pole holder 61 is furnished with a radial arm provided on its edge with ratchet teeth 64 (Fig. 7) for engagement by a retaining pawl 65 pivotally secured to one of the frame uprights and normally held in ratchet-engaging position by means of a spring 66,—movement of this pawl by the spring being limited by a pin 66ᵃ. The pawl may be depressed manually by means of a handle 67 so as to release it from the ratchet teeth 64.

The hub of the pole holder is furnished with a cam 68 (Figs. 3 and 6) adapted to engage a fixed cam 69 secured to the frame, so that as the pole holder is swung in a clockwise direction, as viewed in Fig. 6, the pole holder with its shaft is constrained to move axially of the shaft to the left (as viewed in Fig. 3). The hub of the pole holder is also furnished with a cam projection 70 (Fig. 6) adapted, when the pole holder has been moved to the left, as viewed in Fig. 3, to enter a curved slot in a plate 71 fixedly secured to the frame, the end of said slot having a cam surface cooperable with the cam 70 to move the pole holder to the right, as viewed in Fig. 3, when the pole holder is swung in a counterclockwise direction, (as viewed in Fig. 6). The pole holder hub is also furnished with a clutch member 72 which, when the pole holder is moved to the left, as viewed in Fig. 3, may enter any one of a plurality of openings 73 (Fig. 7) in the ratchet wheel 39. When thus disposed in one of said openings, any substantial rotation of the ratchet wheel 39 in a counterclockwise direction, as viewed in Fig. 7, will cause one of the spokes of the ratchet wheel to engage and drive the clutch member 72 and the pole holder 61 in a counterclockwise direction through a limited arc.

The hub of the pole holder is also furnished with an arm 74 having an end surface 75 which is adapted, when the pole is disposed in the set position, to engage the upper surface of the web 44 of the U-shaped controlling device and to support the pole holder in set position closely adjacent the forward limit of its swing.

At a convenient point the drive shaft 27 is furnished with a disk member 76 (Fig. 8) fixedly secured to the shaft and having a circumferentially movable rim portion 77 (Figs. 3, 5 and 8) provided with gear teeth on its periphery. The ring portion 77 is furnished with an internal projection 78 which is disposed within an arcuate slot 79 in the edge of the disk 76,—this arrangement providing substantial lost motion between the disk 76 and the ring gear 77. The ring gear 77 meshes with a pinion 80 (Figs. 3 and 5) arranged to turn freely on a shaft 81 mounted in suitable bearing openings in the upright frame members and having one end projecting through an opening in the side wall 7 of the casing and arranged for the reception of a removable crank handle 82 (Fig. 1) useful in turning the reel manually.

The pinion 80 is furnished with a hub 83 (Fig. 3) forming one element of a clutch device, the other element 84 of which comprises a sleeve splined to the shaft 81 so as to turn with the latter but to slide axially thereon. The member 84 is furnished with a peripheral groove which receives a fork 85 fixed to a rock shaft 86 (Fig. 3) mounted in suitable bearings in the frame and provided with a hand lever 87 which extends outwardly through a slot in the side wall 7 of the casing. By operating this handle the pinion 80 may be clutched to or disengaged from the shaft 81.

A bevel pinion 88 is secured to the shaft and meshes with a bevel pinion 89 fixed to the other end of a short vertical shaft 90 mounted to turn in bearings in the frame. A large gear 91 is secured to the shaft 90 and meshes with a small pinion 92 fixed to the vertical reel-shaft 93 also turning in bearings in the frame. This shaft 93 carries the reel 94 about which the line L (Fig. 1) is wound. The shaft 93 is also furnished with a worm 95 meshing with a worm-gear 96 on a horizontal shaft 97 turning in bearings in the frame. At one end, this shaft 97 is furnished with a disk 98 (Figs. 3 and 6) having a projecting pin 99 which engages a slotted crosshead 100. This crosshead is guided to slide vertically by means of a bar 101 (Fig. 6) moving in a vertically elongate slot in a guide 102 fixed to the frame member 5. The bar 101 carries a line-guide 103 which projects out through a vertical slot in the frame member 5, and preferably out through the slot 15 (Fig. 2) in the end wall of the casing. The vertical movement of this line guide properly distributes the line upon the reel 94 as the latter is rotated.

The operation of the device has been generally indicated in the above description but will be briefly set forth as follows: Assuming that the pole holder is in the rearward or full line position shown in Fig. 1, with the line wound on the reel, and extending through the guide 103 and through guides G on the pole, the operator will first draw off a suitable length of line and place a bait on the hook. The operator then turns the handle 57 so as to rock the shaft 56 to the position indicated in Fig. 7, and turns the winding handle 19 so as to wind up the spring motor comprising the several springs within their drums. During this winding operation the ratchet 39 is held stationary by the pawl 41 so that the springs may be placed under tension. The operator then depresses the handle 67 so as to release the pawl 65 from the ratchet teeth 64 and swings the pole holder (together with the pole) forwardly. In thus swinging forwardly the pole holder is constrained to move axially by engagement with the cams 68 and 69 so that the clutch member 72 eventually enters one of the openings 73 in the ratchet wheel 39 while the cam member 70 enters the slot in the fixed plate 71. At the end of this movement the cam surface 75 on the arm 74 is in contact with the upper surface of the web 44 of the U-shaped controlling device and thus supports the pole holder in set position.

Before winding up the motor, the operator manipulates the handle 87 so as to disengage the clutch elements 83 and 84, thus leaving the reel free, and after winding the operator may draw off sufficient line to enable him to cast the hook with its bait into the water. The handle 87 is now manipulated to clutch the members 83 and 84, thereby connecting the reel through the gearing above described to the drive shaft, it being noted that the arrangement of the parts 76 to 79 inclusive is such as to furnish substantial lost motion between the drive shaft and the reel-shaft.

The operator now manipulates the handle 57 so as to rock the shaft 56 and thereby to swing the cams 58 and 59 downwardly to the position shown in Fig. 6, thus leaving the plate 60 and the U-shaped controller free to be actuated, as now to be described.

If now a fish takes the bait and exerts any substantial forward pull on the pole, the pressure exerted by the part 75 on the web 44 is sufficient to disengage the latch pawl tooth 41ᵃ from the ratchet tooth 40. As soon as the tooth is disengaged, the wheel 39 begins to turn, and one of a pair of cams 39ᵃ on the edge of the wheel engages the arm 41 and moves the latter further down. Therefore, the retaining plate 52 swings above it, as shown in Fig. 6, and thus prevents its return to upward position by the spring 51. As soon as the ratchet wheel 39 is released, the main shaft 27, 27ᵃ is immediately set into motion by the spring motor, the first effect being to cause the clutch element 72 to be engaged by one of the arms of the ratchet 39 thereby to swing the pole holder 61 in a counterclockwise direction, as viewed in Fig. 6. The motion thus imparted to the pole is a short sharp one, quickly jerking the line and thereby effectively hooking the fish. As the pole holder swings in a counterclockwise direction, the engagement of the cam 70 with the cam surface at the end of the slot in the plate 71 causes the pole holder to move axially, so that just before it reaches the limit of its swing in a counterclockwise direction the clutch member 72 is disengaged from the ratchet wheel 39, thereby freeing the ratchet wheel for further rotation, although the pole holder swings through but a short arc. As the pole holder reaches the end of this arcuate movement in a rearward direction the ratchet teeth 64 are engaged by the pawl 65 thus holding the pole in its rearward position. During this first short movement of the drive shaft 27, the projection 78 moves in the slot 79 so that no substantial movement is imparted to the ring gear 77, but as the pole reaches the end of its swing the projection 78 reaches the end of the slot 79 and thereupon the reel-shaft begins to turn and the line is drawn in rapidly and wound up upon the reel, this movement continuing until the fish has been safely landed.

While herein I have shown the mechanism as comprising a plurality of spring drums, it is to be understood that a single spring of appropriate strength may be employed, and further that any other desirable and equivalent motor means may be substituted for the spring motor here disclosed. I further contemplate that other elements of equivalent character may be substituted for the various mechanical devices herein disclosed, all within the scope of the appended claims.

I claim:

1. Fishing apparatus comprising a spring motor, a shaft driven thereby, latch means normally preventing the shaft from turning in response to force exerted by the motor, a pole having a line-guide, a pole holder having a socket for the reception of the pole, said pole holder being arranged to swing in an arc about the axis of the drive shaft and also to move axially of the drive shaft, a drive element fixed to the drive shaft, a clutch element carried by the pole holder and engageable with said drive element when the pole holder is at one limit of its axial movement, cam means operative as the pole holder is swung toward set position to move it axially until its clutch element is engaged with the drive element, and cam means automatically operative to move the pole holder axially in the opposite direction to disengage said clutch and drive elements as the pole is swung away from set position by the operation of the motor.

2. Fishing apparatus comprising a spring motor, a drive shaft actuated by the motor, a latch normally holding the shaft stationary in opposition to the turning force of the motor, a rotary reel for a line, a pole holder, said pole holder being arranged to swing through a limited arc and also to move in a lateral direction, disengageable connections for transmitting swinging motion to the pole holder from the drive shaft when the pole is disposed in one lateral position, cam means operative as the pole so swings to move it toward its other lateral position, and thereby disengage it from said motion transmitting connections, and means operative after the pole holder has been so disengaged, to rotate the reel.

3. Fishing apparatus comprising a spring motor, a drive shaft actuated by the motor, a latch normally holding the shaft stationary in opposition to the turning force of the motor, a rotary reel for a line, a pole holder, said pole holder being arranged to swing through a limited arc and also in a lateral direction, disengageable connections for transmitting swinging motion to the pole holder from the drive shaft when the pole holder is disposed in one lateral position, cam means operative, as the pole holder so swings, to move it toward its other lateral position, and thereby disengage it from said motion transmitting connections, means for locking the pole holder in the position to which it is so swung, and means operable by the drive shaft for rotating the reel.

4. Fishing apparatus comprising a spring motor, a drive shaft actuated by the motor, a latch normally holding the shaft stationary in opposition to the turning force of the motor, a rotary reel for a line, a pole holder, said pole holder being arranged to swing through a limited arc and also to move in a lateral direction, disengageable connections for transmitting swinging motion to the pole holder from the drive shaft when the pole holder is disposed in one lateral position, cam means operative, as the pole holder so swings, to move it toward its other lateral position and thereby disengage it from said motion transmitting connections, and means operative, in response to force tending to swing the pole holder in one direction, to release the latch and thereby permit the motor to swing the pole holder through said arc in the opposite direction.

5. A portable fishing apparatus comprising a spring motor, means for winding the motor, a drive shaft actuable by the motor, a ratchet fixed to the drive shaft, said ratchet having an opening therein, a pole holder arranged to swing about the axis of the drive shaft and to move axially of the latter, a clutch element carried by the pole holder and disposed within said opening in the ratchet when the pole holder is at one limit of said axial movement thereby to connect the pole holder to the drive shaft, and cam means operative, after a predetermined angular movement of the drive shaft and pole holder, to move the pole holder axially and thereby remove said clutch element from said opening.

6. Fishing apparatus comprising a spring motor, a drive shaft actuated by the motor, a ratchet attached to the shaft, a latch pawl engageable with the ratchet for holding the shaft stationary in opposition to the turning force of the motor, a pole holder mounted to swing in an arcuate path, connections, including disengageable clutch elements, for transmitting motion from the drive shaft to said pole holder, said clutch elements being arranged automatically to disengage when the pole holder has been moved through a predetermined arc away from a set position, a reel, connections between the drive shaft and reel for turning the reel, means carried by the pole holder for releasing the latch pawl thereby to permit the motor to turn the drive shaft and thereby rotate the reel, retaining means to prevent premature engagement of the latch pawl with its ratchet, and manually actuable means for making said retaining means inoperative.

FRED KORNICHUK.